United States Patent
Boerger

(10) Patent No.: US 11,831,404 B2
(45) Date of Patent: Nov. 28, 2023

(54) METHOD FOR ASCERTAINING SIGNAL PROPAGATION TIMES, AND SYSTEM FOR FUSING SENSOR DATA FROM AT LEAST TWO SENSORS FOR AN OBJECT DETECTION

(71) Applicant: Robert Bosch GmbH, Stuttgart (DE)

(72) Inventor: Joachim Boerger, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/653,160

(22) Filed: Mar. 2, 2022

(65) Prior Publication Data

US 2022/0345237 A1 Oct. 27, 2022

(30) Foreign Application Priority Data

Apr. 21, 2021 (DE) ...................... 10 2021 203 976.6

(51) Int. Cl.
*H04J 3/06* (2006.01)
*H04L 67/12* (2022.01)

(52) U.S. Cl.
CPC ............ *H04J 3/0667* (2013.01); *H04L 67/12* (2013.01)

(58) Field of Classification Search
CPC ............................... H04J 3/0667; H04L 67/12
See application file for complete search history.

(56) References Cited

U.S. PATENT DOCUMENTS

| | | | | |
|---|---|---|---|---|
| 7,269,097 | B1* | 9/2007 | Steinbrecher | H04B 11/00 367/134 |
| 8,755,469 | B1* | 6/2014 | Su | H04L 27/0006 375/342 |
| 9,178,544 | B1* | 11/2015 | Su | H04W 4/70 |
| 10,285,141 | B1* | 5/2019 | Carver | A61B 5/0015 |
| 2016/0209236 | A1* | 7/2016 | Steinhardt | G01C 25/005 |
| 2016/0226677 | A1* | 8/2016 | Margon | H04L 67/12 |

(Continued)

FOREIGN PATENT DOCUMENTS

| | | |
|---|---|---|
| CN | 104035752 A | 9/2014 |
| DE | 112011100223 T5 | 1/2013 |

(Continued)

*Primary Examiner* — Bailor C Hsu
(74) *Attorney, Agent, or Firm* — NORTON ROSE FULBRIGHT US LLP; Gerard Messina

(57) ABSTRACT

A method for synchronizing at least two environment sensors of a multi-sensor system using a central processing unit. In the method, the environment sensors acquire sensor signals that represent at least one item of environment information. The respective environment sensors generate data packets which include the respective acquired sensor signals and/or measured variables derived from the sensor signals in each case. These data packets are received by the central processing unit via a data network. Signal propagation times of the data packets for each environment sensor are ascertained using an algorithm, and a mean signal propagation time of data packets from a respective environment sensor is determined based on a content comparison of the measured variables included by the data packets with corresponding measured variables from data packets of at least one other environment sensor, and the determined mean signal propagation time is assigned to the respective environment sensor.

12 Claims, 2 Drawing Sheets

(56) References Cited

U.S. PATENT DOCUMENTS

| | | | |
|---|---|---|---|
| 2016/0266239 A1* | 9/2016 | Pavao-Moreira | G01S 13/34 |
| 2016/0352388 A1* | 12/2016 | Lane | H04B 1/3822 |
| 2017/0254882 A1* | 9/2017 | Malik | G01S 7/412 |
| 2018/0239220 A1* | 8/2018 | Peraelae | H04N 23/10 |
| 2019/0238436 A1 | 8/2019 | Volos et al. | |
| 2019/0294176 A1* | 9/2019 | Ozbilgin | G06V 20/56 |
| 2019/0311625 A1* | 10/2019 | Anvari | G08G 1/165 |
| 2020/0104611 A1* | 4/2020 | Ross | G06F 18/24 |
| 2020/0295861 A1* | 9/2020 | Zinner | H04J 3/14 |

FOREIGN PATENT DOCUMENTS

| | | |
|---|---|---|
| DE | 102017108765 A1 | 10/2018 |
| DE | 112016006564 T5 | 11/2018 |

\* cited by examiner

METHOD FOR ASCERTAINING SIGNAL PROPAGATION TIMES, AND SYSTEM FOR FUSING SENSOR DATA FROM AT LEAST TWO SENSORS FOR AN OBJECT DETECTION

CROSS REFERENCE

The present application claims the benefit under 35 U.S.C. 119 of German Patent Application No. DE 10 2021 203 976.6 filed on Apr. 21, 2021, which is expressly incorporated herein by reference in its entirety.

FIELD

The present invention relates to a method for ascertaining signal propagation times and to a system for fusing sensor data from at least two sensors for an object detection in which such a method is used. In addition, the present invention relates to a computer program.

BACKGROUND INFORMATION

In what is known as multi-sensor systems, multiple environment sensors are employed for acquiring an environment of a vehicle, for instance. In conventional systems the sensors are installed near one another (e.g., video+radar in the vehicle), which results in propagation time differences in merely minimal ranges. Series systems are furthermore designed in such a way that the propagation time differences are constant and known, which means that they can be easily subtracted in the evaluation and sensor data fusion.

Other distributed sensor systems, e.g., monitoring cameras, have an NTP (Network Time Protocol) or similar possibilities for synchronizing the internal clock time.

Novel sensor systems distributed in a complex manner are not only made up of different sensor systems but also have sensors that are distributed across large areas (e.g., multiple superhighway tunnels) and in turn require complex network architectures because simple Ethernet connections may possibly no longer be an option here due to a cable length restriction, etc. The required switches, converters, radio links, etc. not only result in greater but also variable or unknown changes in the signal propagation times.

For example, such multi-sensor systems may be used for the infrastructure-based support of partially or fully automated vehicles, for instance in order to supplement the different strengths of different types of environment sensors, e.g., a high lateral precision of cameras together with a high longitudinal precision of a radar sensor system. With the aid of a multi-sensor system, it is generally also possible to cover a greater visual range in comparison with an individual sensor. Multi-sensor systems are furthermore suitable for satisfying certain safety requirements such as the redundant object detection by independent sensor types based on different physical measuring principles.

Generally, such a multi-sensor system includes a multitude of environment sensors, which transmit their acquired measured or object data in the form of data packets via a data network to a central processing unit (fusion server) where the measured or object data are able to be further processed and fused, for instance. The signal propagation times of the data packets usually differ for each involved environment sensor, which may be due to the network architecture (e.g., the cable lengths, switches, firewalls, VPN, and/or the signal processing of the environment sensor.

Under the condition that the environment sensors have been synchronized with one another in advance, e.g., per NTP (Network Time Protocol), data packets transmitted by each environment sensor arrive with an absolute time stamp $t_{stamp}$. As an alternative, given known signal propagation times dt, it is possible to calculate this time stamp retroactively in the module of the central processing device by $t_{stamp} := t_{Now} - dt$, where $t_{Now}$ denotes the arrival instant of the data packet.

For the further processing of the measured and/or object data after arrival in the central processing unit, the measured data (e.g., object positions) are usually converted to the same time stamp in advance with the aid of a prediction/retrodiction. The fusion algorithms, etc. are then able to be used.

In real structures, some environment sensors, especially those having a simple design, often do not have such an NTP mechanism or a similar mechanism, and the signal propagation times dt are unknown or even variable. One possible strategy, for example, then consists of ignoring the signal propagation time and of specifying time stamps at the time of arrival of the respective data packet: $t_{stamp} := t_{Now}$.

From experience, propagation times on the scale of dt=50 ms are realistic. For instance, when rapid objects are detected, e.g., vehicles on a superhighway driving at speeds of up to v=180 km/h, then this may produce a deviation of up to 2.5 meters in the worst case. The fusion of data exhibiting such a fuzziness and also the resulting precision of the fused object position may thus be greatly affected. At the very least, what is as 'false negative events' may be produced, for instance when an agreement between two sensor concepts is required for a confidence ascertainment. In a worst-case scenario, a corresponding system could thus not intervene and a possible accident, especially in the case of rapid vehicles, is unable to be prevented.

China Patent Application No. CN 104035752 A describes a vehicle-based multi-sensor system.

German Patent Application No. DE 11 2011 100 223 T5 describes the time synchronization of measurements performed by a plurality of measuring devices.

German Patent Application No. DE 10 2017 108 765 A1 describes devices, methods and computer programs for an ascertainment and a transmission in a mobile communications system, and a system for a time-synchronized scanning.

An object of the present invention may therefore be seen as providing a possibility for reliably ascertaining signal propagation times of environment sensors of a networked sensor system not synchronized in advance.

SUMMARY

According to a first aspect of the present invention, a method for synchronizing at least two environment sensors of a multi-sensor system with the aid of a central processing unit is provided. In accordance with an example embodiment of the present invention, the method includes the following steps:

To begin with, the environment sensors acquire sensor signals which represent at least one item of environment information.

The sensor signals may particularly include information about one or more objects in the environment of the environment sensor. For example, the environment sensors may be permanently positioned on a street or a traffic infrastructure. The environment sensors can include radar sensors and/or lidar sensors and/or cameras, for example, and at least two of the environment sensors have a different development. However, it is also possible that the environment sensors have the same development.

The environment sensors, for example, may be fixedly situated within an infrastructure, e.g., on a roadway or in the region of a tunnel entrance or inside a tunnel. As an alternative or in addition, some or all of the environment sensors may be placed on a vehicle, for instance. The central processing unit may likewise have a stationary development, e.g., as a server or as what is known as an RSU (Road Side Unit).

In a next step, the respective environment sensors generate data packets which include the acquired sensor signals and/or measured variables derived from the sensor signals.

In a further step, these data packets are received by the central processing unit via a data network. The data network may have cable-bound and/or wireless data transmission paths.

According to an example embodiment of the present invention, the present invention, signal propagation times of the data packets for each environment sensor are ascertained with the aid of an algorithm, and a mean signal propagation time of data packets of a respective environment sensor is determined based on a content comparison of the measured variables included by the data packets with corresponding measured variables of data packets from at least one other environment sensor, and the determined mean signal propagation time is assigned to the respective environment sensor.

In other words, a comparison of the measured variables acquired by two different environment sensors is performed and a time offset dt is determined for which the measured variables agree, e.g., within a certain error tolerance. This time offset dt then describes the relative difference in the signal propagation times of the two examined environment sensors. Generally conventional methods such as a matching algorithm in conjunction with an outlier detection may be used for determining time offset dt, or alternatively a method based on a cross-correlation or something similar.

According to an example embodiment of the present invention, the measured variables that are able to be compared to one another with regard to their contents may include a distance from an object and/or an object position and/or a velocity of an object and/or an object class and/or an object form and/or an object height, for instance.

Based on the determined time offset dt, each data packet is now preferably able to be provided with a corrected time stamp, the corrected time stamp being determined with the aid of the mean average signal propagation time for the respective environment sensor transmitting the data packet. A possibly subsequent fusion step may be performed on the basis of the corrected time stamps, which increases the quality and reliability of a sensor data fusion.

Especially preferably, one of the environment sensors is selected as the reference sensor, and signal propagation times of the data packets of the other environment sensors are determined based on a content comparison of measured variables with corresponding measured variables acquired by the reference sensor. A corrected time stamp of the data packets is now able to be determined relative to the reference sensor in each case.

A signal propagation time between the reference sensor and the central processing unit is able to be determined in advance, in particular with the aid of a network time protocol (NTP), an absolute time stamp based on this signal propagation time being assigned to the data packets of the reference sensor. This makes it possible to assign an absolute time basis to the reference sensor In one preferred embodiment of the present invention, mean signal propagation times of the data packets for the environment sensors are able to be calculated with the aid of a matching algorithm. In the process, the signal propagation time for each environment sensor is ascertained by comparing the incoming data packets with the incoming data packets of a reference environment sensor.

Especially preferably, the ascertainment of the signal propagation times is carried out in that for at least one pair of environment sensors, a set of quadruples is determined from measured variable $x_1$ acquired by a first environment sensor, associated uncorrected first measurement time $t_1$, measured variable $x_2$ acquired by a second environment sensor, associated uncorrected second measurement time $t_2$, for which it applies that the first measured variable and the second measured variable: $x_1=x_2$ (e.g., by an interpolation of the measured values), and that the difference between the uncorrected first measurement time $t_1$ and the uncorrected second measurement time $t_2$ is less than a predefined limit value c: $|t_1-t_2|<c$, and that at the first measurement time t1, no further sensor signals were acquired by the first environment sensor that result in a measured variable close to the first measured variable (within an interval $x_1 \pm d$) and that at second measurement time $t_2$, no further sensor signals were acquired by the second environment sensor that result in a measured variable close to the second measured variable (within an interval $x_2 \pm d$), that is to say, neither $(x_1', t_1)$ with $|x_1-<d$ nor $(x_2', t_2)$ with $|x_2-x_2'|<d$ applies, and for each one of the found quadruples satisfying these conditions, a signal propagation time difference is generated from the first measurement time and the second measurement time: $dt_{1,2}=t_1-t_2,=dt_1-dt_2$, and a mean propagation time difference $dt_{1,2,final}$ is calculated as a mean value of the signal propagation time differences across all found quadruples, and the first environment sensor is selected as the reference sensor, the mean propagation time difference being determined as the signal propagation time of the second environment sensor. For example, in this context it may hypothetically be assumed that the signal propagation time $dt_1$ or $dt_2=0$. The arriving data packets from the other environment sensor may be provided with a time stamp that is corrected with regard to the reference sensor. For instance, if the second environment sensor is selected as the reference sensor, then $dt_2=0$ und $t_1=t_2+dt_{1,2\ final}$ applies.

According to a second aspect of the present invention, a method for fusing sensor signals from at least two environment sensors with the aid of a central processing unit is provided. In accordance with an example embodiment of the present invention, the method includes the steps Acquiring sensor signals that represent at least one item of environment information with the aid of the environment sensors, generating data packets which include the individually acquired sensor signals and/or measured variables derived from the sensor signals by the environment sensors, and for each environment sensor a mean signal propagation time is determined according to a method according to the first aspect of the present invention;

receiving of the data packets from the environment sensors by the central processing unit via a data network, a time stamp being assigned to each data packet based on the mean signal propagation time of the respective environment sensor;

fusing the sensor data included by the data packets based on the respective time stamp.

According to a third aspect of the present invention, a multi-sensor system for the fusing of sensor data for an object detection is provided, which has at least two environment sensors and a central processing unit. The central processing unit, which may also be called a fusion server, is developed to synchronize the environment sensors with the aid of a method according to the first aspect of the present invention and to fuse the sensor data included by the data packets transmitted by the environment sensors based on ascertained signal propagation times.

The present invention advantageously allows for the ascertainment of signal propagation times in a multi-sensor and fusion system having a complex, partly unknown network architecture. Thanks to the precise data-driven ascertainment of the signal propagation times, data packets from different and random sensors are able to be converted to a common time base.

In this way, the present invention allows for an optimized fusing of the measuring results from multiple environment sensor systems, especially in the detection of rapidly moving objects. In addition, a high measuring quality, also independently of the fusion, is achieved because measuring errors that would be produced by a faulty signal propagation time are eliminated. The present invention furthermore avoids what is known as 'false positives'. When a fusion algorithm is unable to achieve a match for two measurements, e.g., due to measuring errors caused by faulty signal propagation times, and thus is unable to achieve merging of the sensor signals or measured values, then—depending on the design—both measurements are generally retained, so that one of the measurements is superfluous and may lead to undesired reactions (e.g., autonomous emergency braking). In addition, the present invention allows for monitoring of the entire system by monitoring the signal propagation times for changes.

If even just one environment sensor in the entire system is equipped with an absolute time base, then this sensor may be used as the reference also for adjusting all connected sensors to the same time basis (e.g., atomic time) with the aid of the introduced method. Because of the individual signal propagation times dt ascertained in the introduced method, a reconciliation with the local time and the following correction is trivial.

The ascertainment of the signal propagation times according to the present invention may preferably be undertaken not only once. If the method is running along on a permanent basis and the signal propagation times of the involved environment sensors are continuously updated, it can particularly be ensured that in a reconfiguration of the data network, for instance, the new corrected propagation times and thus also corrected time stamps are quickly ascertained. Significant deviations of the relative signal propagation times may thus be used for a diagnosis, for instance, in order to classify a system state as unsafe and to take corresponding measures. Further applications featuring considerably greater signal propagation times, e.g., also via wireless data links (e.g., radio links), are possible.

BRIEF DESCRIPTION OF THE DRAWINGS

Example embodiments of the present invention are described in detail in the following text with reference to the figures.

DETAILED DESCRIPTION OF EXAMPLE EMBODIMENTS

Figure 1:
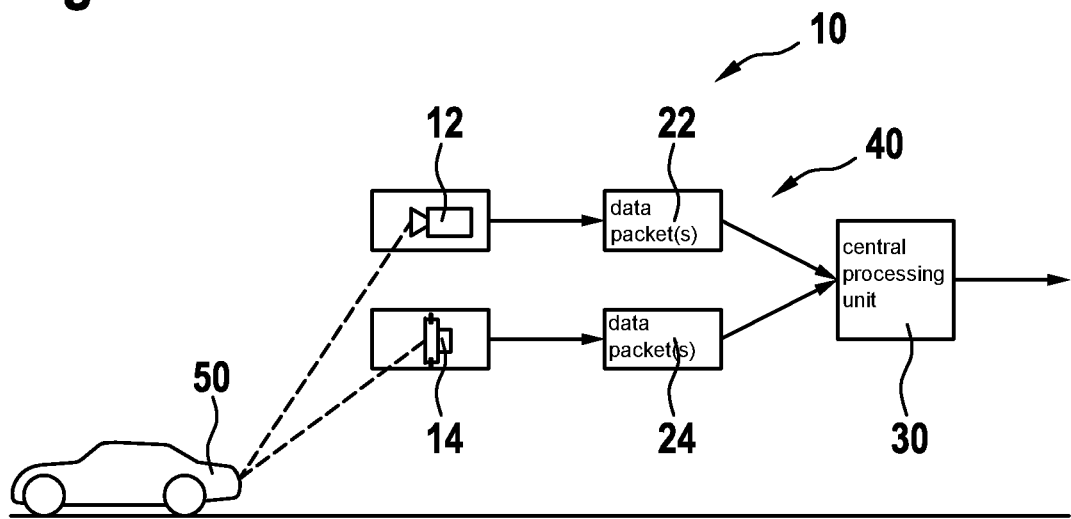
FIG. 1 schematically shows a multi-sensor system for fusing sensor data for an object detection according to an exemplary embodiment of the present invention.

In the following description of the exemplary embodiments of the present invention, identical elements are denoted by matching reference numerals, and a repeated description of these elements is omitted, as the case may be. The figures illustrate the subject matter of the present invention merely schematically.

FIG. 1 shows a multi-sensor system 10 for fusing sensor data for an object detection according to an exemplary embodiment of the present invention. Multi-sensor system 10 in this example includes two environment sensors 12, 14, first environment sensor 12 being embodied as a camera sensor and second environment sensor 14 being embodied as a radar sensor. In this particular example, environment sensors 12, 14 are permanently situated within a street infrastructure and detect objects 50, e.g., road users moving within a certain region of a street or traffic lane. For instance, the environment sensors may acquire an entrance region of a tunnel and/or the interior of a tunnel. As an alternative, however, it is also possible within the framework of the present invention that one or more environment sensors of the multi-sensor system are not stationary, i.e., are situated on board a vehicle, for example.

The sensor data acquired by environment sensors 12 and 14 represent environment information, e.g., information pertaining to positions of objects within the respective acquisition region of environment sensors 12 and 14. Based on the acquired sensor signals, measured variables are able to be derived that characterize the environment information such as a distance between respective environment sensor 12, 14 and an object 50. The sensor signals and/or the measured variables derived therefrom are transmitted from respective environment sensor 12, 14 to a central processing unit 30 in the form of data packets 22, 24 via a data network 40. Central processing unit 30 is developed to merge (fuse) the environment information included by data packets 22, 24 and in this way prepare a comprehensive and reliable environment model, for instance.

Data packets 22, 24 usually arrive at central processing unit 30 with different time delays $dt_{Radar}$ and $dt_{camera}$ due to the specific network architecture (cable length, switches, firewalls, VPN, . . . ) of data network 40. In order to further process the data after its arrival in central processing unit 30, the data must be converted into identical time stamps prior to the fusion.

In this particular example, first environment sensor 12 (camera sensor) has been synchronized in advance per NTP (Network Time Protocol) so that data packets 22 bear an absolute time stamp $t_{stamp}$. Second environment sensor 14 in this particular image has not been synchronized in advance so that data network 40 must first ascertain a precise signal propagation time of data packets 24.

According to the present invention, signal propagation times of data packets 24 for second environment sensor 14 are ascertained with the aid of an algorithm in that the measured variables included by data packets 24 are compared in terms of their content to the measured variables included by data packets 22 of first environment sensor 12. In the present example, both environment sensors 12 and 14 determine a time-dependent distance d to an object 50 as a measured variable. After the conversion to a uniform coordinate system, the measured distances are able to be compared and a mean signal propagation time be determined relative to absolute time stamp $t_{stamp}$ of first environment sensor 12.

Figure 2:
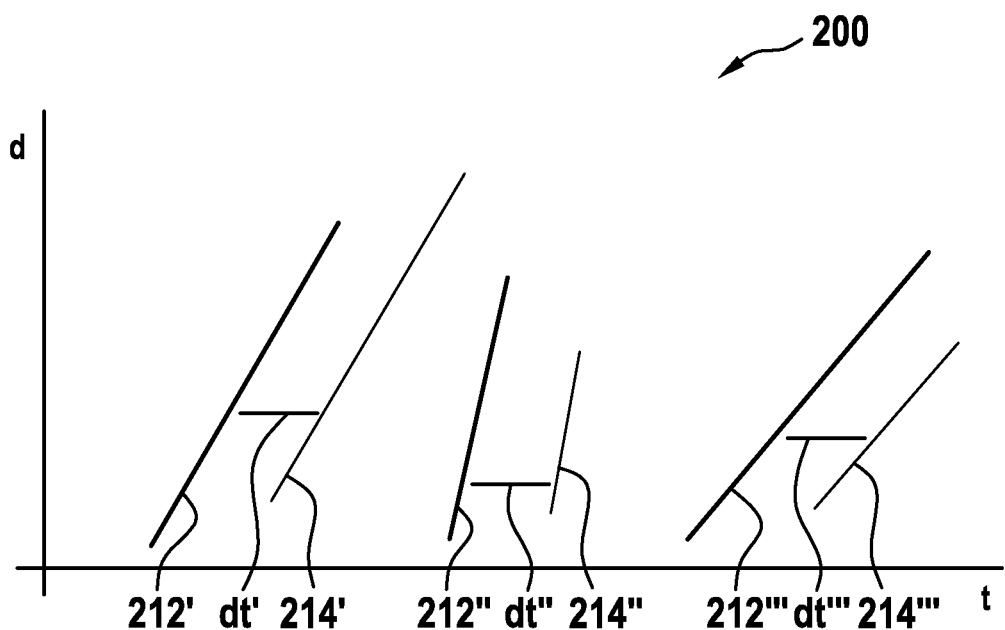
FIG. 2 exemplarily shows a diagram of measured variables acquired over time with the aid of a multi-sensor system for fusing sensor data for an object detection according to the present invention.

This procedure is described in greater detail in FIG. 2. FIG. 2 shows a diagram of possible measured variables acquired by environment sensors 12 and 14.

Here, data packets including measured variables transmitted by environment sensors 12 and 14 arrive at central processing unit 30, the time stamps for each measured value initially simply corresponding to the arrival instant of the data packets in central processing unit 30. Received from first environment sensor 12 (the camera sensor) are measurement curves 212', 212'', 212''', which represent the time-dependent distances to three detected objects in the detection range of environment sensors 12, 14. Each measuring point has the coordinate $(dx_{Camera}, t_{StampCamera, Receive})$ Received from second environment sensor 14 (the radar sensor) are measurement curves 214', 214'', 214''', which likewise represent time-dependent distances to the same three detected objects in the detection range of environment sensors 12, 14. Each measuring point has the coordinate $(dX_{Radar}, t_{StampRadar, Receive})$.

In this example, the three detected objects, which may involve vehicles, for example, move away from the sensor system at a constant velocity (in other words, dx increases). The time offset dt', dt'', dt''' between the arrival of the camera data and the considerably later radar data is shown in greatly emphasized form. The signal propagation times of environment sensors 12 and 14 are denoted by $dt_{camera}$ and $dt_{Radar}$.

The following applies per definition:

$$t_{StampCamera} + dt_{Camera} = t_{StampCamera,Receive}$$

$$t_{StampRadar} + dt_{Radar} = t_{StampRadar,Receive}$$

where $t_{StampCamera}$, $dt_{Camera}$, $t_{StampRadar}$ and $dt_{Radar}$ are unknown to begin with. In the first step, no absolute time stamps are taken into account yet, which means that environment sensors 12 and 14 are first synchronized with one another. For this purpose, the respective signal propagation times $dt_{Radar}$ and $dt_{Camera}$ are determined except for an additive constant. Searched for is time offset $dt_{Radar, Camera} = dt_{Radar} - dt_{Camera}$.

A conventional matching algorithm in conjunction with an outlier detection may be used for this purpose, and a method based on a cross-correlation or something similar may be used as an alternative. The precise selection of the algorithm is not meant to be limited here, but the following possibility serves as an illustration.

To begin with, a sufficiently large set of quadruples $(dX_{Radar}, t_{Camera, Receive}, dx_{Camera}, t_{Radar, Receive})$ is determined with the aid of the matching algorithm, for which the following conditions are satisfied:

$dx_{Radar} = dx_{camera}$ (if no matching measured values are available for distance d, they may be ascertained by an interpolation, for example)

$|t_{Radar, Receive} - t_{Camera, Receive}| < c$, at the same instant, NO further measurements take place in the physical environment in order to avoid mismatches, that is to say neither $(dx'_{Radar}, t_{Radar, Receive})$ with $|dX_{Radar} - dx'_{Radar}| < d$ nor $(dx'_{Camera}, t_{Camera, Receive})$ with $|dX_{Camera} - dx'_{Camera}| < d$ where c and d describe previously determined threshold values.

In a next step, the respective signal propagation time differences $dt_{Radar, Camera} = dt_{Radar} - dt_{camera} = t_{Radar} - t_{Camera}$ are calculated for each one of these quadruples (matches).

Now, the signal propagation time difference $dt_{Radar,Camera}$ is able to be calculated by averaging, e.g., as a median, a set of individual results, sufficiently distributed over the time, of individual results from the preceding step.

Thereafter, first environment sensor 12 (camera sensor) is able to be selected as the reference. For the time being, it is hypothetically assumed that the signal propagation time $dt_{camera} = 0$. The data packets from second environment sensor (radar data) arriving at instant $t_{Now}$ are now able to be provided with a time stamp $t_{Radar, Camera}$ corrected relative to first environment sensor 12:

$$t_{Radar,Camera}' = t_{Now} - dt_{Radar,Camera}.$$

With the aid of NTP or similar mechanisms it can be ensured that first environment sensor 12 (or randomly any other reference sensor in the system) is synchronized with the fusion server. As a result, the correct time stamps for all incoming sensor packets 22, 24 are finally able to be specified in the time basis of the fusion server. To this end, $dt_{camera}$ is determined to begin with by assigning an internal time stamp $t_{Camera,send}$ in first environment sensor 12 when data packets 22 are transmitted. Thanks to the synchronized timer of first environment sensor 12 and central processing unit 30, $dt_{camera}$ is then able to be directly "read out" as $dt_{camera} = t_{Camera, Receive} - t_{Camera, Send}$.

Here, too, it is advantageous to view multiple measurements that are averaged, e.g., via a median, in order to achieve greater stability.

It is now possible to determine the actual, absolute signal propagation time also for environment sensor 14 not synchronized via NTP, i.e., the radar sensor in the example: $dt_{Radar} = dt_{Radar, Camera} + dt_{camera}$.

Thanks to the now known signal propagation times, the correct time stamp is able to be specified in the time basis of central processing unit 30 upon arrival of each data packet in central processing unit 30:

$t_{Radar, Measured} = t_{Radar, Received} - dt_{Radar tCamera, Measured} = t_{Camera, Received} - dt_{camera}$ (accordingly $t_{Camera,Send}$, with the exception of minimal fluctuations if there are changes in the signal propagation times).

Within the framework of the present invention, this principle can be transferred to general scenarios featuring more than two environment sensors. If multiple environment sensors are involved, the previously described determination of signal propagation time difference $dt_{Radar,Camera}$ is applied to each individual environment sensor, that is to say, the signal propagation time difference with respect to a first selected environment sensor used as the reference sensor is always applied. As an alternative, randomized matching with randomly selected pairs of environment sensors or complete matching of all environment sensors with one another is possible. This may require a greater processing effort but can increase the stability of the system.

Figure 3:
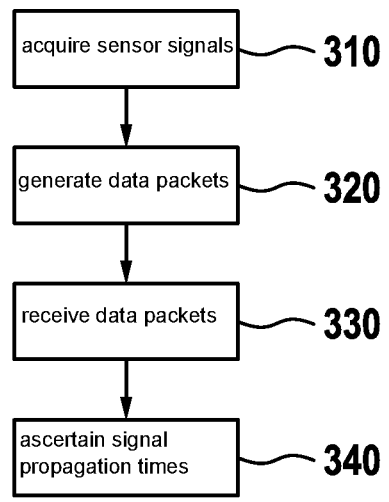
FIG. 3 shows a flow diagram of a method for synchronizing two environment sensors of a multi-sensor system according to an exemplary embodiment of the present invention.

In FIG. 3, an exemplary embodiment of a method according to the present invention for synchronizing two environment sensors of a multi-sensor system with the aid of a central processing unit is shown in the form of a flow diagram. In a first step 310, sensor signals representing at least one item of environment information are acquired by the environment sensors. In a second, following step 320, data packets are generated which include the respectively acquired sensor signals and/or measured variables derived from the sensor variables by the environment sensors. In a subsequent, third step 330, the data packets from the environment sensors are received by the central processing unit via a data network. In a fourth step 340, signal propagation times of the data packets are ascertained for each environment sensor with the aid of an algorithm, and a relative mean signal propagation time of data packets from one of the environment sensors is determined based on a content comparison of the measured variables included by the data packets with corresponding measured variables from data packets of the other environment sensor, and the determined relative mean signal propagation time is assigned to the respective environment sensor.

Figure 4:
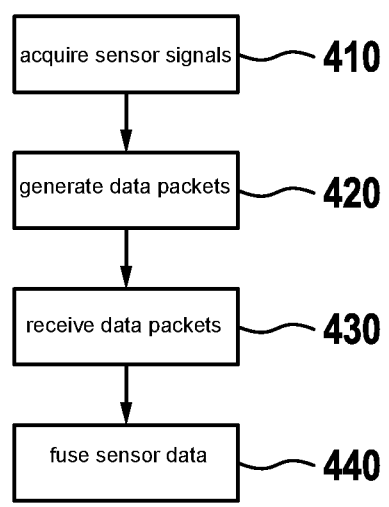
FIG. 4 shows a flow diagram of a method for fusing sensor signals from two environment sensors according to an exemplary embodiment of the present invention.

FIG. 4 shows, in the form of a flow diagram, an exemplary embodiment of a method according to the present invention for fusing sensor signals from two environment sensors with the aid of a central processing unit. In a first step 410, sensor signals representing at least one item of environment information are acquired by the environment sensors. In a second step 420, data packets including the acquired sensor signals and/or measured variables derived from the sensor signals are generated by the environment sensors, and a mean signal propagation time is determined for each environment sensor according to a method according to the first aspect of the present invention. In a following step 430, data packets of the environment sensors are received by the central processing unit via a data network, and a time stamp is assigned to each data packet based on the previously ascertained mean signal propagation time of the respective environment sensor. In a subsequent step 440, the central processing unit fuses the sensor data included by the data packets on the basis of the respective time stamp.

What is claimed is:

1. A method for synchronizing at least two environment sensors of a multi-sensor system according to signal propagation times of the environment sensors, the method comprising the following steps:
    acquiring, by the environment sensors, sensor signals which represent at least one item of environment information;
    generating data packets, by the environment sensors, which include at least one of: the acquired sensor signals, or measured variables derived from the sensor signals;
    receiving the data packets from the environment sensors by a central processing unit via a data network;
    ascertaining, by the central processing unit, the signal propagation times of the data packets for each respective sensor of the environment sensors using an algorithm, the ascertaining including determining a mean signal propagation time of data packets of each respective environment sensor based on a comparison of the measured variables included in the data packets of the respective environment sensor with corresponding measured variables of data packets from at least one other environment sensor, and using the determined mean signal propagation time as a signal propagation time of the data packets of the respective environment sensor.

2. The method as recited in claim 1, wherein each data packet of the data packets is provided with a corrected time stamp, and the corrected time stamp is determined using the ascertained mean signal propagation time for the respective environment sensor transmitting the data packet.

3. The method as recited in claim 1, wherein one of the environment sensors is selected as a reference sensor, and the signal propagation times of the data packets are determined based on a content comparison of measured variables with corresponding measured variables acquired by the reference sensor, and corrected time stamps of the data packets are determined relative to the reference sensor in each case.

4. The method as recited in claim 3, wherein a signal propagation time between the reference sensor and the central processing unit is determined in advance using a Network Time Protocol (NTP), and an absolute time stamp based on the determined signal propagation time is assigned to the data packets of the reference sensor.

5. The method as recited in claim 1, wherein the ascertaining of the mean signal propagation times of the data packets for the environment sensors takes place using a matching algorithm, and for each of the environment sensors, the signal propagation time is ascertained using incoming data packets by a comparison with a reference environment sensor.

6. The method as recited in claim 1, wherein the measured variables include at least one of: a distance from an object, an object position, a velocity of an object, an object class, an object form, or an object height.

7. The method as recited in claim 1, wherein the ascertainment of the signal propagation times is implemented in that for at least one pair of environment sensors, a set of quadruples is determined from a measured variable acquired by a first environment sensor, associated uncorrected first measurement time, measured variable acquired by a second environment sensor, associated uncorrected second measurement time, for which it holds
    that the first measured variable and the second measured variable match, and
    that a difference between the uncorrected first measurement time and the uncorrected second measurement time is less than a predefined limit value, and
    that at the first measurement time, no further sensor signals were acquired by the first environment sensor that result in a measured variable close to the first measured variable, and
    that at the second measurement time, no further sensor signals were acquired by the second environment sensor that result in a measured variable close to the second measured variable;
    wherein for each one of the quadruples, a signal propagation time difference is generated from the first measurement time and the second measurement time, and a mean propagation time difference is calculated as a mean value of the signal propagation time differences, and the first environment sensor is selected as the reference sensor and the mean propagation time difference is determined as the signal propagation time of the second environment sensor.

8. A method for fusing sensor signals from at least two environment sensors using a central processing unit, the method comprising the following steps:

acquiring, by the environment sensors, sensor signals that represent at least one item of environment information;

generating, by the environment sensors, data packets which include at least one of: the acquired sensor signals, or measured variables derived from the sensor signals;

for each respective environment sensor of the environment sensors, determining a mean signal propagation time;

receiving the data packets from the environment sensors by the central processing unit via a data network, a time stamp being assigned to each of the data packets based on the mean signal propagation time of the respective environment sensor; and fusing the sensor data included in the data packets based on the respective time stamps.

9. The method as recited in claim 8, wherein, for each respective sensor, the mean signal propagation time is determined based on a content comparison of the measured variables included in the data packets of the respective environment sensor with corresponding measured variables of data packets from at least one other environment sensor.

10. A multi-sensor system for fusing sensor data for an object detection, comprising:

at least two environment sensors configured to:
acquire sensor signals which represent at least one item of environment information; and
generate data packets which include at least one of: the acquired sensor signals, or measured variables derived from the sensor signals;

a central processing unit configured to synchronize the environment sensors by:
receiving the data packets from the environment sensors via a data network; and
ascertaining signal propagation times of the data packets for each respective sensor of the environment sensors using an algorithm, the ascertaining including determining a mean signal propagation time of data packets of each respective environment sensor based on a comparison of the measured variables included in the data packets of the respective environment sensor with corresponding measured variables of data packets from at least one other environment sensor, and using the determined mean signal propagation time as a signal propagation time of the data packets of being assigned to the respective environment sensor;

wherein the central processing unit is configured to fuse sensor data included in the data packets transmitted by the environment sensors based on the ascertained signal propagation times.

11. The multi-sensor system as recited in claim 10, wherein at least one of the environment sensors is developed as a radar sensor, a light detection and ranging (lidar) sensor, or a camera.

12. The multi-sensor system as recited in claim 11, wherein at least two of the environment sensors have a different development.

* * * * *